United States Patent
Azar et al.

(10) Patent No.: US 8,226,068 B2
(45) Date of Patent: Jul. 24, 2012

(54) VARIABLE GAP BETWEEN HVAC DOOR AND SEALING SURFACES

(75) Inventors: John Azar, LaSalle (CA); Grant Holaiter, Farmington, MI (US); Steve M. Kahrs, Canton, MI (US); James Hurd, Canton, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 770 days.

(21) Appl. No.: 12/399,270

(22) Filed: Mar. 6, 2009

(65) Prior Publication Data

US 2010/0224253 A1  Sep. 9, 2010

(51) Int. Cl.
*F16K 5/00* (2006.01)

(52) U.S. Cl. ........................ 251/314; 454/156

(58) Field of Classification Search .................. 251/298, 251/301, 306, 307, 314, 316, 317, 317.01; 454/156

See application file for complete search history.

(56) References Cited

U.S. PATENT DOCUMENTS

| | | | | |
|---|---|---|---|---|
| 3,234,966 A | * | 2/1966 | Klose | 251/306 |
| 3,298,677 A | * | 1/1967 | Anderson | 251/305 |
| 4,382,725 A | * | 5/1983 | Dugge | 251/299 |
| 5,980,380 A | | 11/1999 | Schwarz | |
| 6,130,696 A | * | 10/2000 | Mashita et al. | 347/86 |
| 7,090,575 B2 | | 8/2006 | Ito et al. | |
| 7,520,803 B2 | * | 4/2009 | Ito et al. | 251/314 |

* cited by examiner

*Primary Examiner* — Eric Keasel
(74) *Attorney, Agent, or Firm* — MacMillan, Sobanski & Todd, LLC

(57) ABSTRACT

A plenum assembly for carrying air in a supply system includes a duct including an opening formed with an inner surface through which air can flow; a door supported for movement between multiple positions which distributes air to the desired output path; and a seal secured to the door. In a vehicles HVAC system, numerous doors are utilized to provide comfort to the passengers based upon user input. The potential exists that some positions of the doors my lead to unwanted noise. A modification to the seal of the door with variable gap widths alleviates this issue and improves satisfaction.

8 Claims, 6 Drawing Sheets

VARIABLE GAP BETWEEN HVAC DOOR AND SEALING SURFACES

BACKGROUND OF THE INVENTION

1. Field of the Invention

This invention relates generally to an apparatus for opening and closing connections among passages that carry air in a heating, ventilation and air conditioning (HVAC) plenum.

2. Description of the Prior Art

A plenum assembly for carrying air in a supply system includes a duct with an inner surface through which air can flow and a door supported for movement between a multitude of open positions, at which flow through the opening is relatively unobstructed, and a sealed position, at which flow through the opening is relatively obstructed. Some positions of the door produce a small gap between the seal and the inner duct surface. The present invention includes a modification to the seal in which this gap has a continuously variable width along at least a portion of a length of the seal.

The variable edge profile provides a gap having a variable width and prevents uniform airflow over the seal. As a result, objectionable high frequency tones and whistles are prevented without compromising the functionality of the seal.

A need exists in the industry for a technique that prevents objectionable noise when the door moves near the sealed position.

SUMMARY OF THE INVENTION

A plenum assembly for carrying air in a supply system includes a duct including an opening formed with a inner surface through which air can flow; a duct including an opening formed with a inner surface through which air can flow; a door supported for movement between a sealed position, at which flow through the opening is relatively unobstructed, and a partially sealed position, at which flow through the opening is relatively obstructed; and a seal secured to the door and producing in the partially sealed position a gap between the seal and the inner surface, the gap having a continuously variable width along at least a portion of a length of the seal.

The variable edge profile on the edge of overmold door seals provides a gap having a variable width and prevents uniform airflow over the seal. As a result, objectionable high frequency tones and whistles are prevented without compromising the functionality of the seal.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
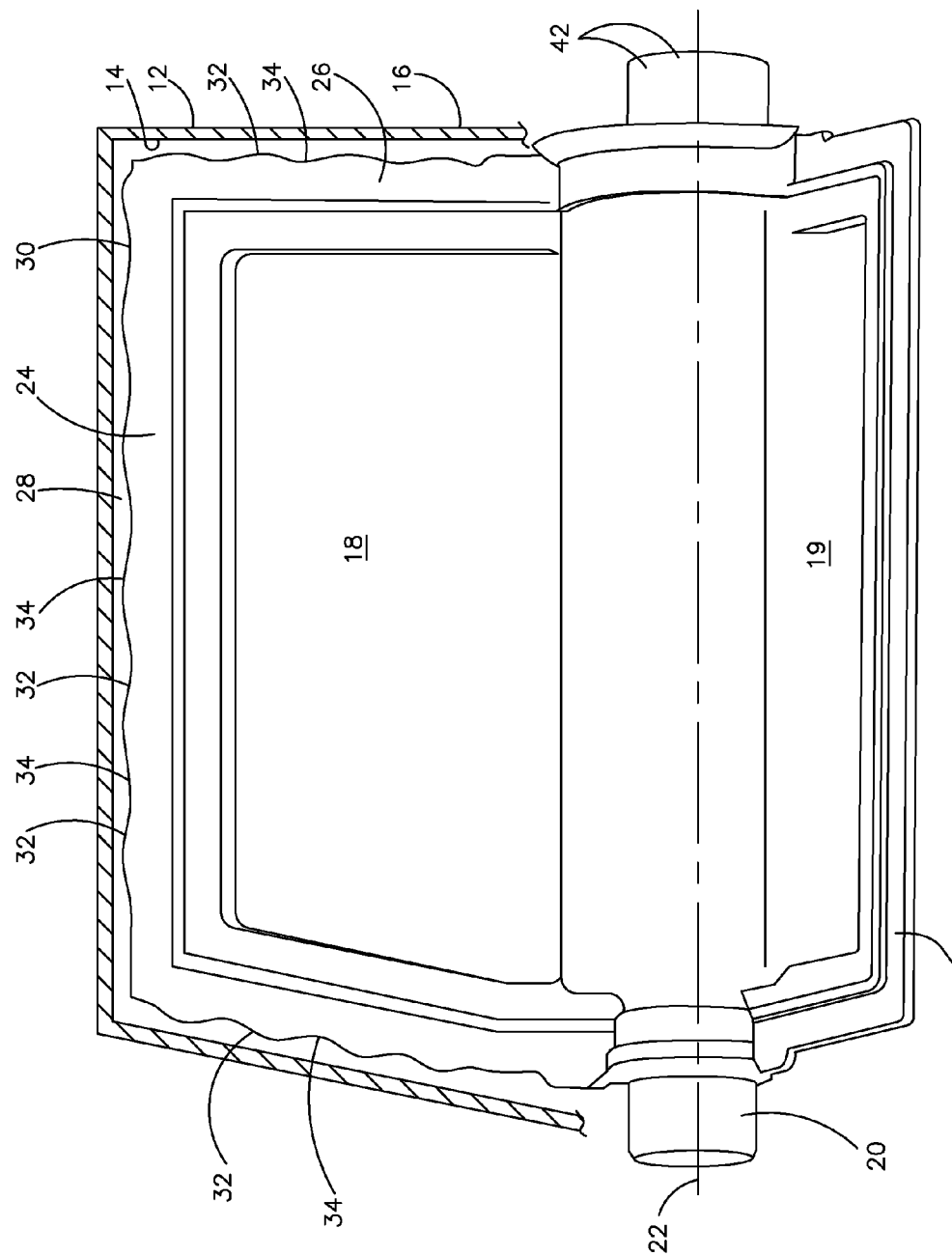
FIG. 1 is a front view of a duct showing a door and seal assembly in relation to the duct walls.

Referring now to the drawings, there is illustrated in FIG. 1 a plenum assembly that includes a duct 12, which carries air in a HVAC system for an automotive application. The duct 12 has been cross sectioned by a transverse plane normal to the length of the duct. An inner surface 14 and an outer surface 16 of the duct 12 are formed with substantially flat surfaces, along which air flows longitudinally in the duct.

A door assembly includes two doors 18, 19, supported on a shaft 20, which rotates about an axis 22. Each door 18, 19 rotates with shaft 20 to a respective sealed position, the sealed position of each door being located at an end of the door's rotary travel. The doors 18, 19 direct air in the duct to selected paths, through which air is delivered from the duct to the passenger compartment of the vehicle.

The doors 18, 19 are preferably formed of a rigid material, while the seal surrounding and secured to the periphery 26 of the door 18, 19 is preferably formed of a relatively soft thermoplastic. This variable design may also be added to the perimeter of a door which does not utilize a thermoplastic seal.

FIG. 1 shows shaft 20 having been rotated about axis 22 to the sealed position of door 18, at which the door 18 and seal 24 substantially obstruct and prevent air flow in duct 18 past the seal and door.

When shaft 20 rotates about axis 22 in either rotary direction to a position at which door 18 and seal 24 are spaced angularly about five degrees from the duct opening, the door and seal are in a partially sealed position. When the door 18 and seal 24 are in the partially sealed position, air can flow in duct 12 through a small gap 28 between the duct's inner surface 14 and the seal's periphery 30. In the partially sealed position, air flow past the seal 24 is partially obstructed, but air flow is substantially greater compared to any flow that may occur past seal 24 when door 18 and seal 24 are in their sealed position.

Similarly, shaft 20 can rotate doors 18, 19 about 100 degrees away from the sealed position of door 18 to the sealed position of door 19, at which door 19 and seal 24 substantially obstruct and prevent air flow in duct 18 past door 19 and seal 24.

When shaft 20 rotates about axis 22 in either rotary direction to a position at which door 19 and seal 24 are spaced angularly about five degrees from the duct opening, door 19 and seal 24 are in their partially sealed position. When door 19 and seal 24 are in their partially sealed position, air can flow in duct 12 through a small gap between the duct's inner surface 14 and the seal's periphery 30. In the partially sealed position, air flow past the seal 24 is partially obstructed but air flow is substantially greater compared to any flow that may occur when door 19 and seal 24 are in their sealed position.

Figure 2:
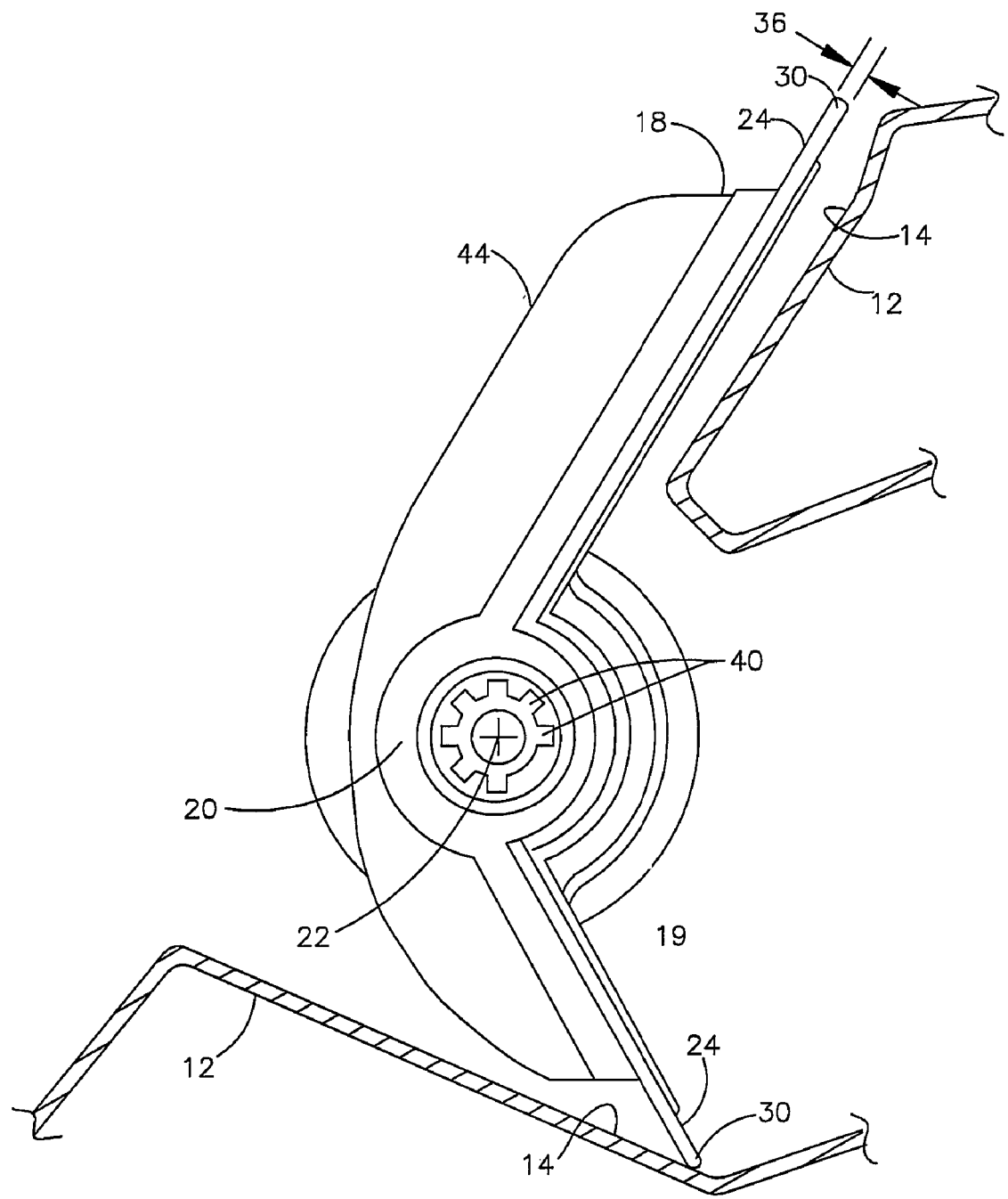
FIG. 2 is side view the door, seal and shaft showing a first door in its partially sealed position and a second door in its sealed position.
Figure 3:
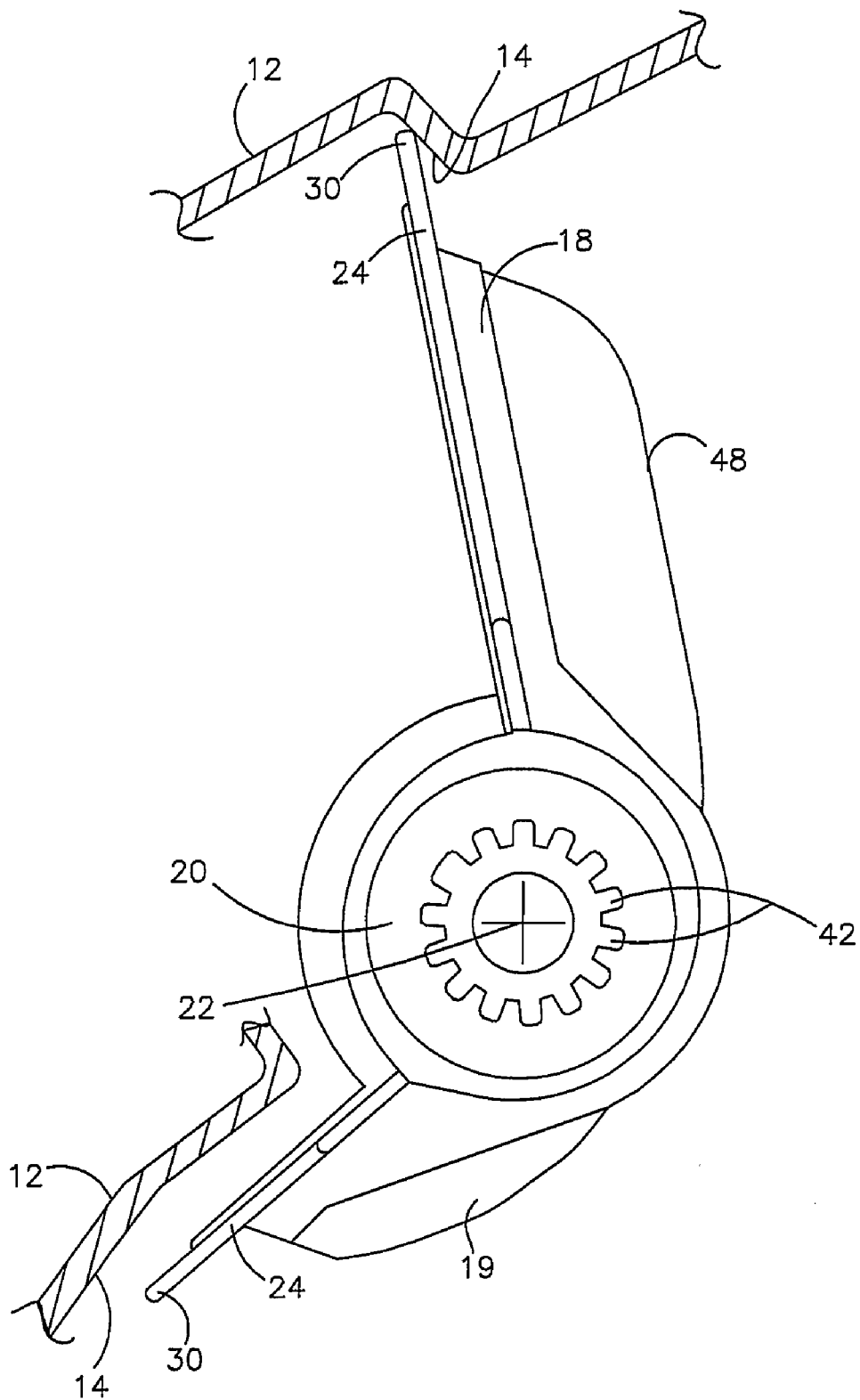
FIG. 3 is a side view of the door, seal and shaft showing the first door in its sealed position and the second door in its partially sealed position.
Figure 4:
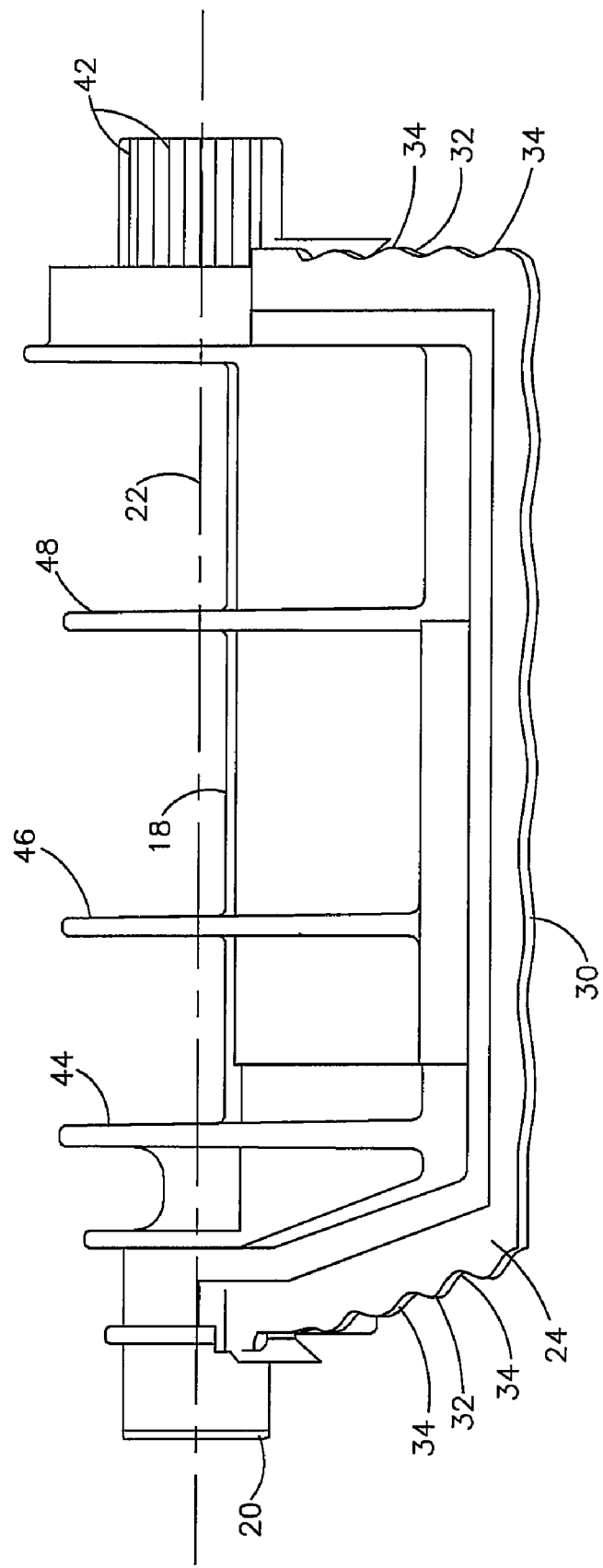
FIG. 4 is a rear view showing the stiffeners at the back of the door.
Figure 5:
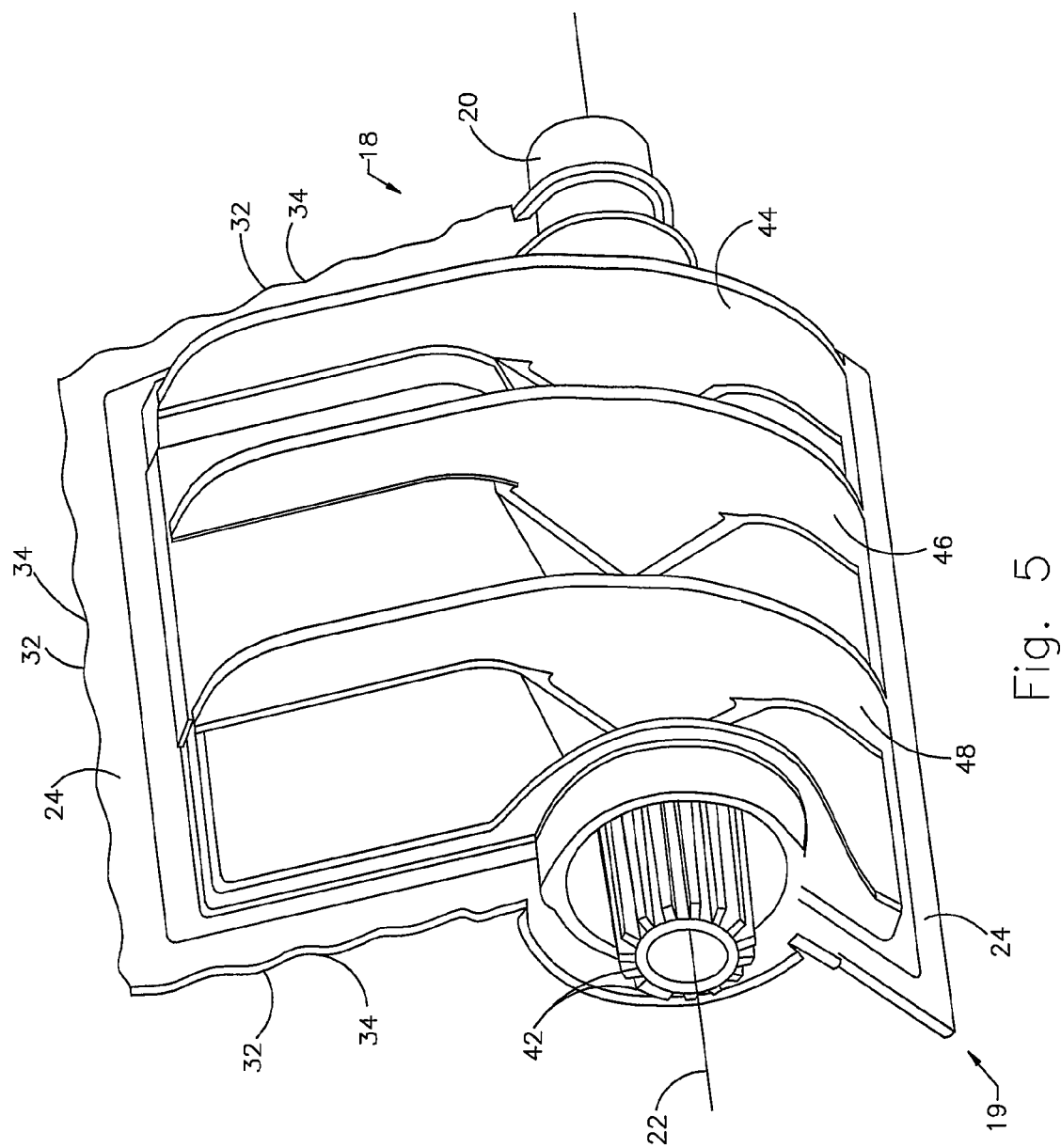
FIG. 5 is a perspective view of the back of the door.

FIG. 2 is side view showing door 18 in its partially sealed position, i.e., spaced a short distance from the inner surface 14 of duct 12, and door 19 in its sealed position contacting surface 14. FIG. 3 is a side view showing door 18 in its sealed position, i.e., contacting the inner surface 14 of duct 12, and door 19 in its partially sealed position, spaced a short distance from the inner surface 14.

In a first embodiment, the seal's periphery 30 is a continuous series of arcuate segments or angular projections forming a border of serrations, preferably a series of ridges 32 and grooves 34 along the peripheral length of the seal 24 and extending across the thickness 36 of the seal 24, as shown in FIG. 2. Preferably the distance between consecutive ridges 32 and grooves 34 is random and non-uniform along the peripheral length of the seal 24, although that spacing may be uniform. Similarly, the height of the ridges 32 and the depth of the grooves 34 are preferably random, although those heights and depths may be uniform along the peripheral length of the seal 24.

FIGS. 2, 3, 4 and 5 show that the right-hand side of shaft 20 is formed with external teeth 42, and the left-hand side is formed with internal teeth 40, and the back of door 18, which faces downstream, is supported by a series of stiffeners 44, 46, 48, spaced mutually across the width of the door.

In the embodiment of FIGS. 1-5, the serration formed by the ridges 32 and grooves 34 causes the gap 28 between the seal's periphery 30 and the duct's inside surface 14 to be non-uniform along the peripheral length of the seal 24. The variable profile of the gap 28 prevents uniform airflow across the seal's thickness 36 and along the peripheral length of the seal 24. As a result, objectionable high frequency tones and whistles are prevented without compromising the functionality of the seal.

Figure 6:
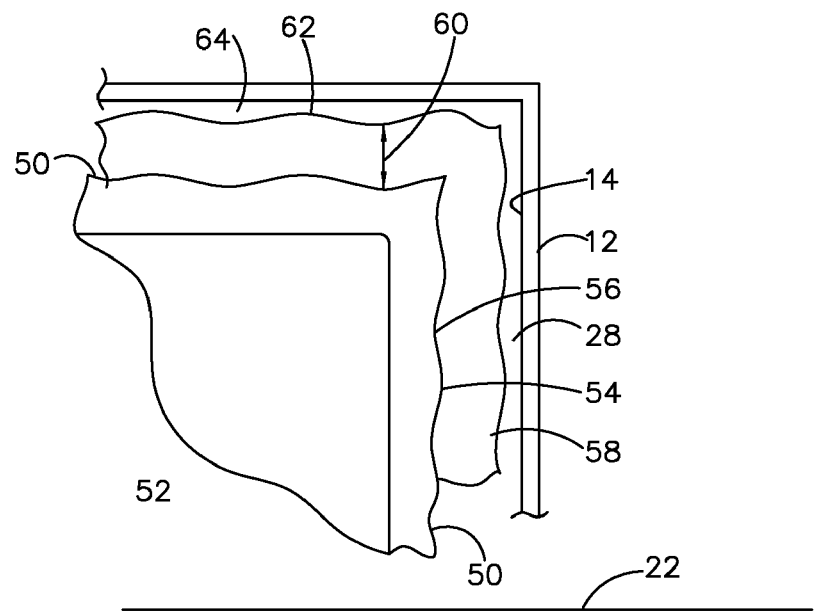
FIG. 6 is a front view of a second embodiment in which the door has a contoured edge and the seal has uniform width.

In the second embodiment shown in FIG. 6, the edge 50 of a door 52 is formed with a continuous series of arcuate segments or projections forming serrations, preferably a series of ridges 54 and grooves 56. A seal 58 formed of relatively soft, vulcanized thermoplastic surrounding and secured to the door's edge 50, has a uniform width 60 and straight sides before being installed on the door's edge 50. Upon installation, the seal's periphery 62 conforms to the contour of the door's edge 50. A gap 64 between the inner surface 14 of the duct 12 and the seal's periphery 62 is a continuous series of arcuate segments or projections forming serrations, preferably a series of ridges and grooves similar to those on the door's edge 50. Preferably the width of gap 64 is random and non-uniform along the peripheral length of the seal 58. This embodiment may also be utilized where the edge 50 of a door 52 does not have a seal attached, but has a series of ridges 54 and grooves 56, which eliminate the uniformity of air passing by.

The door 58 is supported on shaft 20 and rotates with the shaft about axis 22 to the sealed and partially sealed positions. The door 52 is preferably formed of a rigid, polypropylene plastic containing mica.

Serrations formed by the ridges 54 and groove 56 cause the gap 64 between the seal's periphery 62 and the inner surface 14 of duct 12 to be non-uniform along the length of the seal. The variable width of gap 64 prevents uniform airflow across the seal's thickness 36 and along the peripheral length of the seal 58. Objectionable high frequency tones and whistles are prevented without compromising the function of the seal 58.

Figure 7:
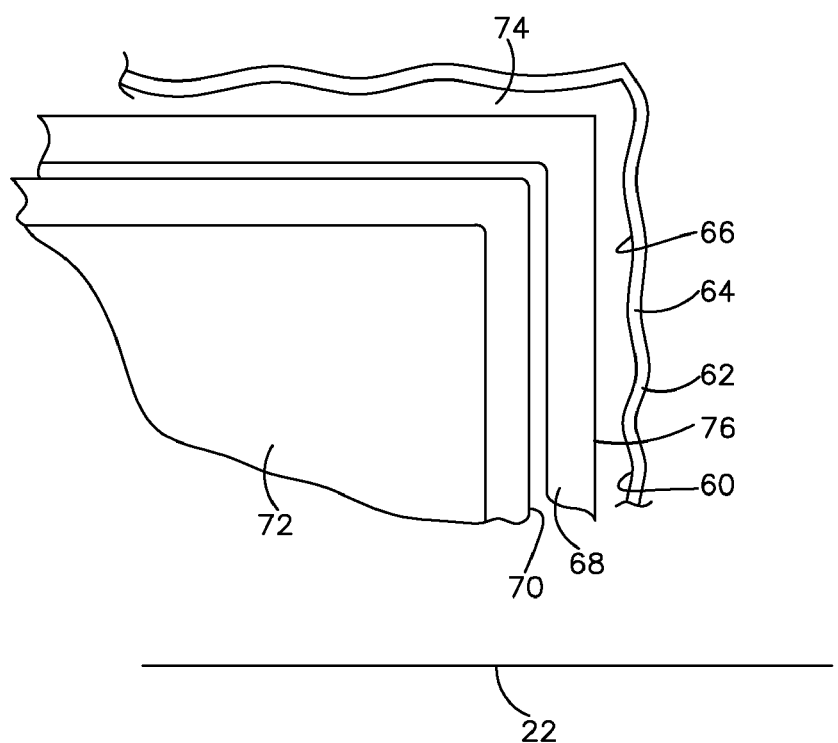
FIG. 7 is a front view of a third embodiment in which the door and seal have straight edges and the duct is contoured.

In the third embodiment shown in FIG. 7, the inner surface 60 of the duct 62 is formed with a continuous series of arcuate segments or projections forming serrations, preferably a series of ridges 64 and grooves 66. A seal 68, formed of relatively soft, vulcanized thermoplastic surrounding and secured to the straight outer edge 70 of the door 72, has a straight outer edge 74, which extends along the peripheral length of the seal.

The width of the gap 74 between the inner surface 60 of the duct 62 and the seal's periphery 76 is continuously variable along the peripheral length of the seal 68. The variable width of gap 64 prevents uniform airflow across the seal's thickness 36 and along the peripheral length of the seal 68. As a result, objectionable high frequency tones and whistles are prevented without compromising the function of the seal 68.

The door 18, 52, 72 may rotate about axis 22, which may be located and directed such that the door pivots to the sealed position downward from above the door or upward from below the door, as shown in FIGS. 1-5, or leftward or rightward. Alternately, the door may slide on a rail or in a track between the sealed and partially sealed positions.

In accordance with the provisions of the patent statutes, the preferred embodiment has been described. However, it should be noted that the alternate embodiments can be practiced otherwise than as specifically illustrated and described.

The invention claimed is:

1. An assembly for carrying air in a supply system, comprising:
    a duct including an opening formed with an inner surface through which air can flow, and the inner surface being parallel to peripheral edges of a door;
    the door supported for movement between a sealed position, at which flow through the opening is relatively unobstructed, and a partially sealed position, at which flow through the opening is relatively obstructed, the door includes a periphery comprising a first series of ridges and grooves extending along at least a portion of a peripheral length of the door; and
    a seal including a second series of ridges and grooves extending along at least a portion of a peripheral length of the seal, secured to the periphery of the door and producing in the partially sealed position a gap between the seal and the inner surface, the gap having a continuously variable width along at least a portion of a length of the seal.

2. The assembly of claim 1 further comprising a shaft supporting the door for pivoting about an axis to the sealed and partially sealed positions.

3. The assembly of claim 1 wherein the second series of ridges and grooves conforms to the shape of the first series of ridges and grooves.

4. The assembly of claim 1 wherein:
    the door is preferably formed of a rigid, polypropylene plastic containing mica; and
    the seal is formed of a relatively soft, vulcanized thermoplastic.

5. An assembly for carrying air in a supply system, comprising:
    a duct including an inner surface parallel to peripheral door edges of a door assembly, and an opening formed with the inner surface through which air can flow;
    a pivot axis;
    the door assembly comprising first and second doors supported about and extending outward from the pivot axis, the first door pivoting between a first sealed position, at which flow through the opening is relatively unobstructed, and a first partially sealed position, at which flow through the opening is relatively obstructed, the second door pivoting between a second position, at which flow through the opening is relatively unobstructed, and a second partially sealed position, at which flow through the opening is relatively obstructed, each door including a periphery comprising a first series of ridges and grooves extending along at least a portion of a peripheral length of the door; and a seal secured to the periphery of each door, including a second series of ridges and grooves extending along at least a portion of a peripheral length of the seal and producing in each partially sealed position a respective gap between the seal and the inner surface, each gap having a continuously variable width along at least a portion of a length of the seal.

6. The assembly of claim 5 wherein the second series of ridges and grooves conforms to the shape of the first series of ridges and grooves.

7. A method for closing an opening in a duct carrying air in a supply system, comprising the steps of:
providing a door with a periphery having a first series of ridges and grooves extending along at least a portion of a peripheral length of the door;
providing a duct including an opening formed with an inner surface through which air can flow, and the inner surface with peripheral edges parallel to the edges of the door;
securing the seal to the periphery of the door and producing in the seal a second series of ridges and grooves extending along at least a portion of a peripheral length of the seal;
supporting the door to move between a sealed position, at which flow through the opening is relatively unobstructed, and a partially sealed position, at which flow through the opening is relatively obstructed;
moving a seal secured to the door to the partially sealed position; and
producing in the partially sealed position between the seal and the inner surface a gap having a continuously variable width along at least a portion of a length of the seal.

8. The method of claim 7 further comprising the step of supporting the door to pivot about an axis between the sealed and the partially sealed positions.

* * * * *